UNITED STATES PATENT OFFICE.

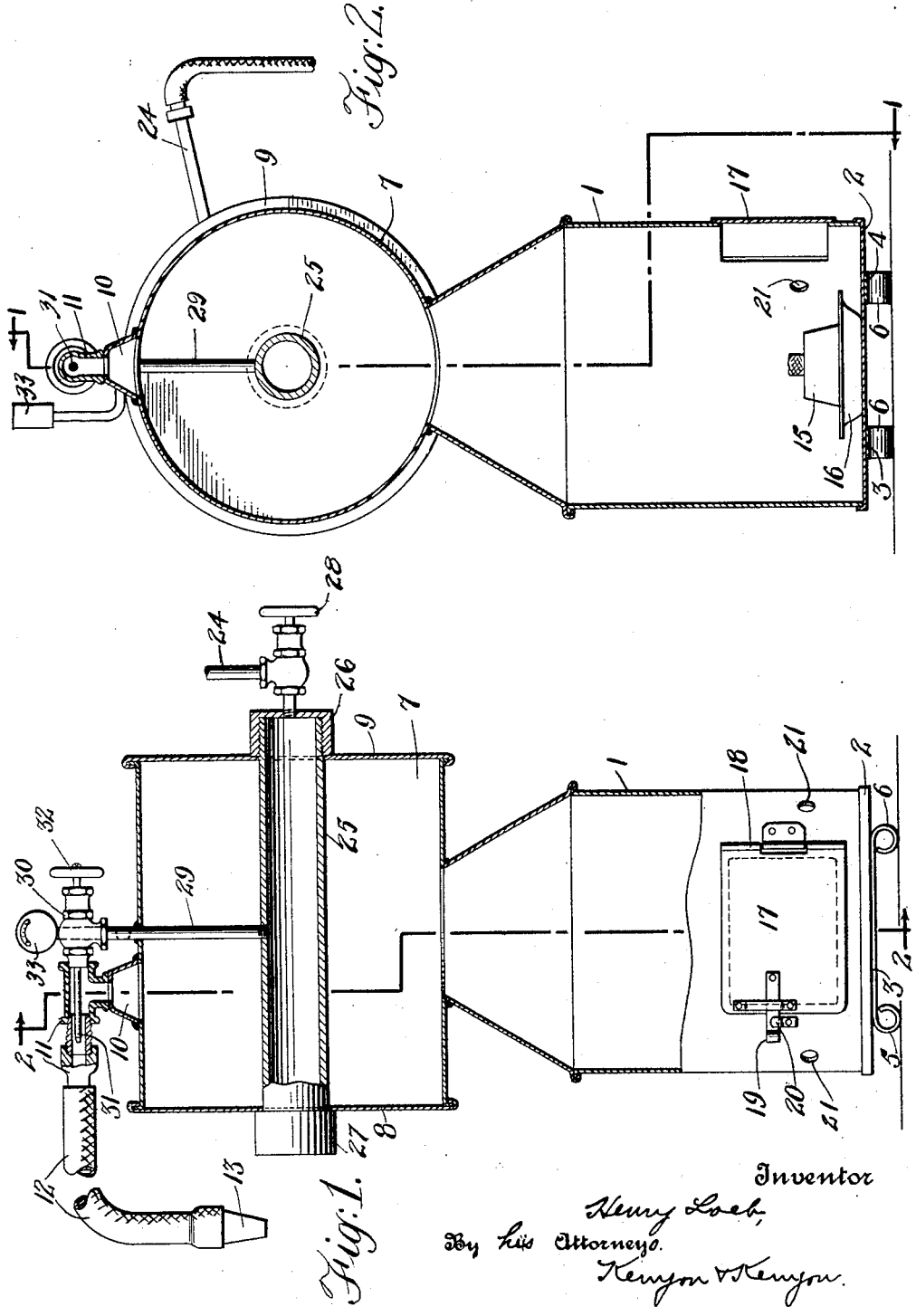

HENRY LOEB, OF NEW YORK, N. Y.

FUMIGATOR.

1,386,125.  Specification of Letters Patent.  Patented Aug. 2, 1921.

Application filed September 16, 1918. Serial No. 254,193.

*To all whom it may concern:*

Be it known that I, HENRY LOEB, a citizen of the United States, residing at New York, county and State of New York, whose post-office address is 1067 Fox street, same place, have invented certain new and useful Improvements in Fumigators, of which the following is a specification.

My invention relates to fumigators, and more particularly to fumigators designed to destroy destructive insects which infest plants. The principal object of the invention is to provide a simple and efficient device of this character. With a view to insuring the thorough fumigation of the plants in parts where such insects may be found, I have provided an improved device of the type wherein the fumes are forced against the plants as by a current of fluid such as air. In addition to the destruction of insect life, such apparatus has the advantage in that the fumes and the air agitate the plant, and thereby tend to cause the insects to fall off the plants to the ground.

Further objects, features and advantages will more clearly appear from the detailed description given below taken in connection with the accompanying drawing which forms a part of this specification and illustrates one embodiment of the invention. In the drawing—

Figure 1 is a view partly in elevation and partly in section taken on the line 1—1 of Fig. 2.

Fig. 2 is a sectional view taken on line 2—2 of Fig. 1.

Referring to the drawing, the device comprises a base portion 1, which, as shown, is formed to provide on the interior thereof a vertical chamber in which the fumes are produced. The base 1 is desirably formed of an upright cylinder of sheet metal having a flat bottom 2 of the same material, the said bottom, as shown, having secured thereto strips of sheet metal 3 and 4, the ends of which are bent to provide feet 5, 6, whereby the apparatus may be supported on the ground. The upper portion of the base 1 is best formed tapered so as to convey the fumes upwardly in an easy manner directly into the fume reservoir 7, above the base 1. As is shown the upper portion of the base is in the form of a cone formed of sheet metal and the reservoir 7 is in the form of a horizontal cylinder desirably also made of sheet metal and secured to the said cone. The cylinder or reservoir 7 is of comparatively large size relatively to the fume producing chamber 1 closed at its ends as shown at 8 and 9 respectively. The fumes from the reservoir 7 are discharged, as will hereafter more fully appear through a suitable conduit, which, as shown, comprises a tapering hollow boss 10 on the top of the reservoir cylinder, pipe connections 11, a hose or flexible conduit 12 and a nozzle 13 at the outer end of the hose.

While any suitable fume producing means may be used, I have shown a disinfecting candle 15 of sulfur or other suitable material, which is supported in a saucer-like holder 16 resting upon the bottom 2 of the base member 1. A door 17 is hinged, as shown at 18 to the member 1 and is adapted to be held in closed position by the pivoted latch 19 which is movable upwardly and downwardly respectively out of and into operative relation to the retaining member 20 which is secured upon base 1. This door permits access to the interior of the base 1 or the combustion chamber to enable the candle to be lighted or extinguished and to enable the candle 15 and holder 16 to be placed in position in the combustion chamber or removed therefrom. The base 1 is also provided with suitable draft openings 21.

The air or other fluid under pressure is supplied as through pipe 24 from a pump, tank or other suitable device and is conveyed into the air reservoir 25 which is desirably arranged within the fume reservoir 7. As shown, the air reservoir 25 is in the form of a cylindrical pipe of large diameter relatively to the pipe connection 24 and extending axially through the cylinder 7, the ends of the pipe 25 being closed by caps 26 and 27 respectively threaded upon the ends of said pipe and bearing against the outer surfaces of the walls 8 and 9 to hold the reservoir 25 against longitudinal movement relatively to the cylinder 7. The valve 28 controls the inlet or supply of fluid to the air reservoir 25. From the reservoir 25 the air is conveyed as by a pipe 29, which is of a small internal diameter relatively to the reservoir, to a coupling 30 through which the air is conveyed to a discharge pipe or a nozzle 31 extending axially along the pipe connection 11 toward the hose 12. The valve 32 controls the passage of air from the pipe 29 into the nozzle pipe 31. A pressure gage 33 connected to the pipe 29 serves to indicate the pressure of the fluid therein and in reservoir 25.

In use the device, which is portable, is carried to a position in proximity to the plants to be fumigated and the candle 15 lighted. Thereupon the fumes pass from the combustion chamber in the base 1 into the fume reservoir 7. The valve 28 being open, air or other fluid under pressure is admitted to the reservoir 25 and upon opening of the valve 32, this air passes out of nozzle pipe 31 at considerable velocity, drawing with it fumes from the fume chamber 7. The mixed fumes and air pass at high velocity through the hose 12 and the nozzle 13, the hose and nozzle permitting the fumes to be directed to the particular part of the plant desired. By the provision of the reservoirs 7 and 25, a steady stream of fumes and air is insured so long as these reservoirs are substantially filled. The drawing of the fumes out of the reservoir 7 creates a suction which improves the combustion in the combustion chamber in the base of the apparatus and the more rapidly the fumes are withdrawn, the greater the draft produced and the more vigorous the burning of the candle 15.

Although I have described my improvement in considerable detail in respect to one particular embodiment of my invention, nevertheless I do not desire to be limited to the details shown and described except where clearly set out in the appended claims, since many changes and modifications may be made without departing from the spirit and scope of my invention.

Having described my invention, what I claim as new and desire to secure by Letters Patent is:

1. The combination of means providing a fume producing chamber, a reservoir arranged outside of said chamber and connected to receive fumes therefrom, a second reservoir arranged within said first reservoir and adapted to contain fluid under pressure, and means for discharging fumes from said first reservoir under the force of fluid from said second reservoir, said reservoirs insuring a substantially steady flow of the fluid and fumes.

2. The combination of means providing a fume producing chamber, a reservoir mounted upon said means and connected to receive fumes from said chamber, a second reservoir arranged within said first reservoir and adapted to receive fluid under pressure, means for discharging fumes from said first reservoir under the force of fluid from said second reservoir, said reservoirs insuring a substantially steady flow of the fluid and fumes, an inlet valve for said second reservoir, and a valve for controlling the discharge of fluid from said second reservoir.

3. The combination of means comprising a fume producing chamber and a separate fume reservoir of considerable size relative to said fume producing chamber and arranged above the latter, and means for supplying a steady stream of fluid under pressure and causing the fumes to be discharged under the force of the fluid.

In testimony whereof, I have signed my name to this specification.

HENRY LOEB.